United States Patent
Tsuda

(10) Patent No.: US 11,827,201 B2
(45) Date of Patent: Nov. 28, 2023

(54) VEHICLE BRAKE CONTROL DEVICE

(71) Applicant: NISSIN KOGYO CO., LTD., Nagano (JP)

(72) Inventor: Fumiya Tsuda, Tomi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 100 days.

(21) Appl. No.: 16/828,187

(22) Filed: Mar. 24, 2020

(65) Prior Publication Data
US 2020/0307533 A1    Oct. 1, 2020

(30) Foreign Application Priority Data

Mar. 25, 2019  (JP) ................................. 2019-056382

(51) Int. Cl.
*B60T 8/1761* (2006.01)
*B60T 8/172* (2006.01)
(Continued)

(52) U.S. Cl.
CPC .......... *B60T 8/17616* (2013.01); *B60T 8/171* (2013.01); *B60T 8/172* (2013.01); *B60T 8/58* (2013.01);
(Continued)

(58) Field of Classification Search
CPC .... B60W 50/14; B60T 8/17616; B60T 8/171; B60T 8/172; B60T 8/58; B60T 2210/14;
(Continued)

(56) References Cited

U.S. PATENT DOCUMENTS

| | | | | |
|---|---|---|---|---|
| 5,627,755 A | * | 5/1997 | Negrin | B60T 8/172 |
| | | | | 180/197 |
| 5,636,121 A | * | 6/1997 | Tsuyama | B60T 8/1755 |
| | | | | 180/197 |

(Continued)

FOREIGN PATENT DOCUMENTS

JP        11078840        3/1999

OTHER PUBLICATIONS

The extended European Search Report issued in EP application No. 20165181.7 dated May 29, 2020, 8 pages.
(Continued)

*Primary Examiner* — Faris S Almatrahi
*Assistant Examiner* — Andrew J Cromer
(74) *Attorney, Agent, or Firm* — Andrew M. Calderon; Calderon Safran & Cole PC

(57) ABSTRACT

A vehicle brake control device including a front wheel speed acquisition section, a rear wheel speed acquisition section, a front wheel acceleration calculation section, a rear wheel acceleration calculation section, a front wheel anti-lock brake control section capable of executing an anti-lock brake control for the front wheel, a vehicle acceleration acquisition section, and a bad road determination section configured to determine whether or not a running road surface is a bad road based on the front wheel acceleration or the rear wheel acceleration. The bad road determination section executes a bad road determination by selectively using one of the front wheel acceleration and the rear wheel acceleration at least based on information on whether or not the anti-lock brake control for the front wheel is executed and the vehicle acceleration.

16 Claims, 5 Drawing Sheets

(51) Int. Cl.
*B60T 8/171* (2006.01)
*B60T 8/58* (2006.01)
(52) U.S. Cl.
CPC ....... *B60T 2210/14* (2013.01); *B60T 2240/00* (2013.01); *B60T 2250/00* (2013.01); *B60T 2270/10* (2013.01)
(58) Field of Classification Search
CPC ............ B60T 2240/00; B60T 2250/00; B60T 2270/10
See application file for complete search history.

(56) References Cited

U.S. PATENT DOCUMENTS

| | | | |
|---|---|---|---|
| 6,089,682 A * | 7/2000 | Ishikawa | B60T 8/1706 303/150 |
| 6,266,602 B1 | 7/2001 | Yamaura | |
| 2009/0187324 A1 * | 7/2009 | Lu | B60W 10/06 701/94 |

OTHER PUBLICATIONS

The extended European Search Report issued in EP application No. 20165182.5 dated May 29, 2020, 9 pages.

* cited by examiner

VEHICLE BRAKE CONTROL DEVICE

CROSS-REFERENCE TO RELATED APPLICATIONS

This application is based upon and claims the benefit of priority from prior Japanese patent application No. 2019-056382, filed on Mar. 25, 2019, the entire contents of which is incorporated herein by reference.

TECHNICAL FIELD

The present disclosure relates to a vehicle brake control device.

BACKGROUND ART

Conventionally, there is known a vehicle brake control device having a configuration in which a brake pressure of a wheel brake is reduced when a slip ratio calculated based on a wheel speed and a vehicle speed exceeds a target slip ratio (see JPH11-078840). In this vehicle brake control device, whether or not a running road surface is a bad road is determined, and a wheel speed used for calculating a slip ratio when a vehicle runs on a bad road is corrected to an increasing side. In this technique, the bad road determination is executed based on a wheel speed and a wheel acceleration of a front wheel or a rear wheel.

SUMMARY

By the way, in the configuration in which the bad road determination is executed based on a wheel speed and a wheel acceleration of either a front wheel or a rear wheel, the accuracy of the bad road determination may be lowered depending on the state of the vehicle.

Therefore, the present disclosure aims to provide a vehicle brake control device capable of improving the accuracy of the bad road determination.

A vehicle brake control device including:
- a front wheel speed acquisition section configured to acquire a wheel speed of a front wheel that is a driven wheel;
- a rear wheel speed acquisition section configured to acquire a wheel speed of a rear wheel that is a drive wheel;
- a front wheel acceleration calculation section configured to calculate a front wheel acceleration based on the front wheel speed;
- a rear wheel acceleration calculation section configured to calculate a rear wheel acceleration based on the rear wheel speed;
- a front wheel anti-lock brake control section capable of executing an anti-lock brake control for the front wheel;
- a vehicle acceleration acquisition section configured to acquire a vehicle acceleration; and
- a bad road determination section configured to determine whether or not a running road surface is a bad road based on the front wheel acceleration or the rear wheel acceleration.

The bad road determination section executes a bad road determination by selectively using one of the front wheel acceleration and the rear wheel acceleration at least based on information on whether or not the anti-lock brake control for the front wheel is executed and the vehicle acceleration.

According to this configuration, since the bad road determination can be executed by properly using the front wheel acceleration and rear wheel acceleration according to the state of the vehicle, the accuracy of the bad road determination can be improved.

The vehicle brake control device according to the above, the bad road determination section may execute the bad road determination by using the front wheel acceleration when the anti-lock brake control for the front wheel is not executed and the vehicle acceleration is larger than a predetermined value.

When the vehicle acceleration is larger than the predetermined value, such as during acceleration in which an acceleration operation is performed, it may be difficult, from the rear wheel acceleration, to distinguish whether an acceleration operation is performed or whether the motorcycle is run on a bad road. Therefore, in this case, the bad road determination is executed using the front wheel acceleration that is stable because the anti-lock brake control is not executed. In this way, the accuracy of the bad road determination can be improved.

The vehicle brake control device according to the above, may include a rear wheel anti-lock brake control section capable of executing an anti-lock brake control for the rear wheel.

The front wheel acceleration calculation section may calculate, as the front wheel acceleration, a first wheel acceleration and a second wheel acceleration in which a high-frequency component is attenuated more than the first wheel acceleration.

The bad road determination section may determine that the running road surface is a bad road when the anti-lock brake control for the rear wheel is executed, and when the first wheel acceleration is larger than a first threshold value and the second wheel acceleration is smaller than a second threshold value.

The bad road determination section may determine that the running road surface is a bad road when the anti-lock brake control for the rear wheel is not executed, and when the first wheel acceleration is smaller than a third threshold value smaller than the first threshold value and the second wheel acceleration is larger than a fourth threshold value.

According to this configuration, since the bad road determination is executed in a state where the threshold values are set for two types of wheel accelerations with different responsiveness, respectively, the accuracy of the bad road determination can be further improved.

The vehicle brake control device according to the above, the fourth threshold value may be smaller than the second threshold value.

The vehicle brake control device according to the above, may include a rear wheel anti-lock brake control section capable of executing an anti-lock brake control for the rear wheel. The bad road determination section may execute the bad road determination by using the rear wheel acceleration when the vehicle acceleration is equal to or less than a predetermined value and the anti-lock brake control for the rear wheel is not executed.

The front wheel acceleration may not be stable during a high deceleration at which the vehicle acceleration is equal to or less than the predetermined value. Therefore, in this case, the anti-lock brake control is not executed, and the bad road determination is executed by using the rear wheel acceleration that is more stable than the front wheel acceleration. In this way, the accuracy of the bad road determination can be improved.

The vehicle brake control device according to the above, may include a rear wheel anti-lock brake control section capable of executing an anti-lock brake control for the rear wheel. The bad road determination section may execute the bad road determination by using the rear wheel acceleration when the anti-lock brake control for the front wheel is executed and the anti-lock brake control for the rear wheel is not executed.

The front wheel acceleration is not stable while the anti-lock brake control is executed. Therefore, in this case, the anti-lock brake control is not executed, and the bad road determination is executed by using the rear wheel acceleration that is more stable than the front wheel acceleration. In this way, the accuracy of the bad road determination can be improved.

The vehicle brake control device according to the above, the rear wheel acceleration calculation section may calculate, as the rear wheel acceleration, a third wheel acceleration and a fourth wheel acceleration in which a high-frequency component is attenuated more than the third wheel acceleration.

The bad road determination section may determine that the running road surface is a bad road when the third wheel acceleration is larger than a fifth threshold value and the fourth wheel acceleration is smaller than a sixth threshold value.

According to this configuration, since the bad road determination is executed in a state where the threshold values are set for two types of wheel accelerations with different responsiveness, respectively, the accuracy of the bad road determination can be further improved.

According to the disclosure, it is possible to improve the accuracy of the bad road determination.

BRIEF DESCRIPTION OF DRAWINGS

FIG. 3A is a diagram when the motorcycle runs on a good road, and FIG. 3B is a diagram when the motorcycle runs on a bad road;

FIG. 4A is a diagram when the motorcycle runs on a good road, and FIG. 4B is a diagram when the motorcycle runs on a bad road.

DETAILED DESCRIPTION

Hereinafter, an embodiment will be described in detail with reference to the drawings as appropriate.

Figure 1:
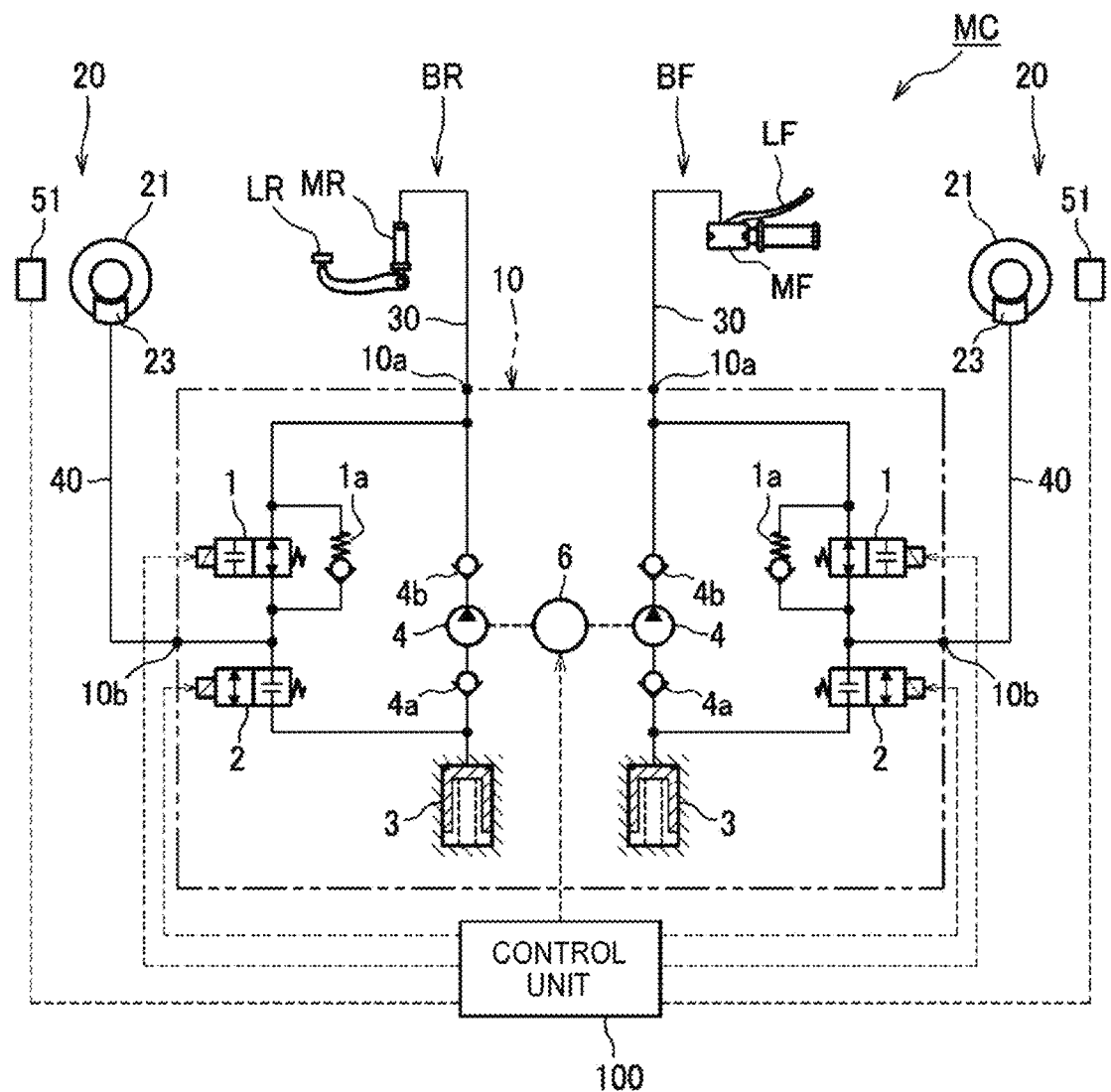
FIG. 1 is a view showing a configuration of a motorcycle including a vehicle brake control device according to an embodiment.

As shown in FIG. 1, a motorcycle MC as an example of a vehicle includes a brake system BF of a front wheel as a driven wheel, a brake system BR of a rear wheel as a drive wheel, wheel speed sensors 51, and a control unit 100 as an example of a vehicle brake control device.

Each wheel speed sensor 51 is a sensor that generates a pulse wave with the rotation of a wheel. The wheel speed sensors 51 are provided on both the front wheel and the rear wheel, and detect the wheel speed of each wheel.

The brake system BF mainly includes a master cylinder MF, a hydraulic unit 10, a front wheel brake 20, a piping 30 connecting the master cylinder MF and an inlet port 10a of the hydraulic unit 10, and a piping 40 connecting an outlet port 10b of the hydraulic unit 10 and the front wheel brake 20. Further, the brake system BR mainly includes a master cylinder MR, the hydraulic unit 10, a rear wheel brake 20, the piping 30 connecting the master cylinder MR and the inlet port 10a of the hydraulic unit 10, and the piping 40 connecting the outlet port 10b of the hydraulic unit 10 and the rear wheel brake 20. Meanwhile, the brake system BR on the rear wheel side has the same configuration as the brake system BF on the front wheel side. In the following description, the brake system BF on the front wheel side will be mainly described, and the description of the brake system on the rear wheel side will be omitted as appropriate.

The master cylinder MF is a device that outputs a hydraulic pressure according to the operation amount of a brake lever LF operated by a driver with a right hand, and the master cylinder MR is a device that outputs a hydraulic pressure according to the operation amount of a brake pedal LR operated by a driver with a right foot.

Each of the wheel brakes 20 mainly includes a brake rotor 21, a brake pad (not shown), and a wheel cylinder 23 that generates a braking force by pressing the brake pad against the brake rotor 21 by the hydraulic pressure output from the master cylinders MF, MR.

The hydraulic unit 10 mainly includes inlet valves 1, check valves 1a, outlet valves 2, reservoirs 3, pumps 4, suction valves 4a, discharge valves 4b, and a motor 6. Normally, a fluid passage communicates from the inlet port 10a to the outlet port 10b, and the hydraulic pressure output from the master cylinder MF is transmitted to the front wheel brake 20.

The inlet valve 1 is a normally-open electromagnetic valve provided between the master cylinder MF and the front wheel brake 20. The inlet valve 1 is normally opened, so that the hydraulic pressure is allowed to be transmitted from the master cylinder MF to the front wheel brake 20. Further, the inlet valve 1 is closed by the control unit 100 when the front wheel is about to be locked, so that the transmission of the hydraulic pressure from the master cylinder MF to the front wheel brake 20 is blocked.

The outlet valve 2 is a normally-closed electromagnetic valve provided between the front wheel brake 20 and the reservoir 3. The outlet valve 2 is normally closed, but is opened by the control unit 100 when the front wheel is about to be locked. In this way, the hydraulic pressure applied to the front wheel brake 20 is released to the reservoir 3.

The check valve 1a is a valve that allows only the flow of the brake fluid from the side of the front wheel brake 20 into the side of the master cylinder MF. The check valve 1a is connected to the inlet valve 1 in parallel. When the input of the hydraulic pressure from the master cylinder MF is released, the check valve 1a allows the flow of the brake fluid from the side of the front wheel brake 20 to the side of the master cylinder MF even when the inlet valve 1 is closed.

The reservoir 3 temporarily stores the brake fluid that is released when the outlet valve 2 is opened. The pump 4 is provided between the reservoir 3 and the master cylinder MF. The pump 4 is driven by the rotation of the motor 6 to suck the brake fluid stored in the reservoir 3 and return it to the master cylinder MF.

The hydraulic unit 10 adjusts a braking force, specifically, a hydraulic pressure of the wheel cylinder 23 (hereinafter, also referred to as a "wheel cylinder pressure") by controlling the opening and closing state of the inlet valve 1 and the outlet valve 2 by the control unit 100. For example, when the brake lever LF is operated in the normal state where the inlet valve 1 is opened and the outlet valve 2 is closed, the hydraulic pressure of the master cylinder MF is transmitted to the wheel cylinder 23 as it is, which leads to a pressure increase state in which the braking force increases. Further, in the state where the inlet valve 1 is closed and the outlet valve 2 is opened, the brake fluid is discharged from the wheel cylinder 23 toward the reservoir 3, which leads to a pressure reduction state where the braking force decreases. Furthermore, in a state where both the inlet valve 1 and the outlet valve 2 are closed, the hydraulic pressure of the wheel cylinder 23 is maintained, which leads to a maintenance state where the braking force is maintained.

The control unit 100 is a device that mainly executes a wheel lock suppression control for suppressing the lock of the front wheel or the rear wheel by controlling the hydraulic unit 10. The control unit 100 includes, for example, a Central Processing Unit (CPU), a Random Access Memory (RAM), a Read Only Memory (ROM), and an input/output circuit, and the like. The control unit 100 executes a control by performing various arithmetic processing based on an input from the wheel speed sensor 51, a program and data stored in the ROM, and the like.

Figure 2:
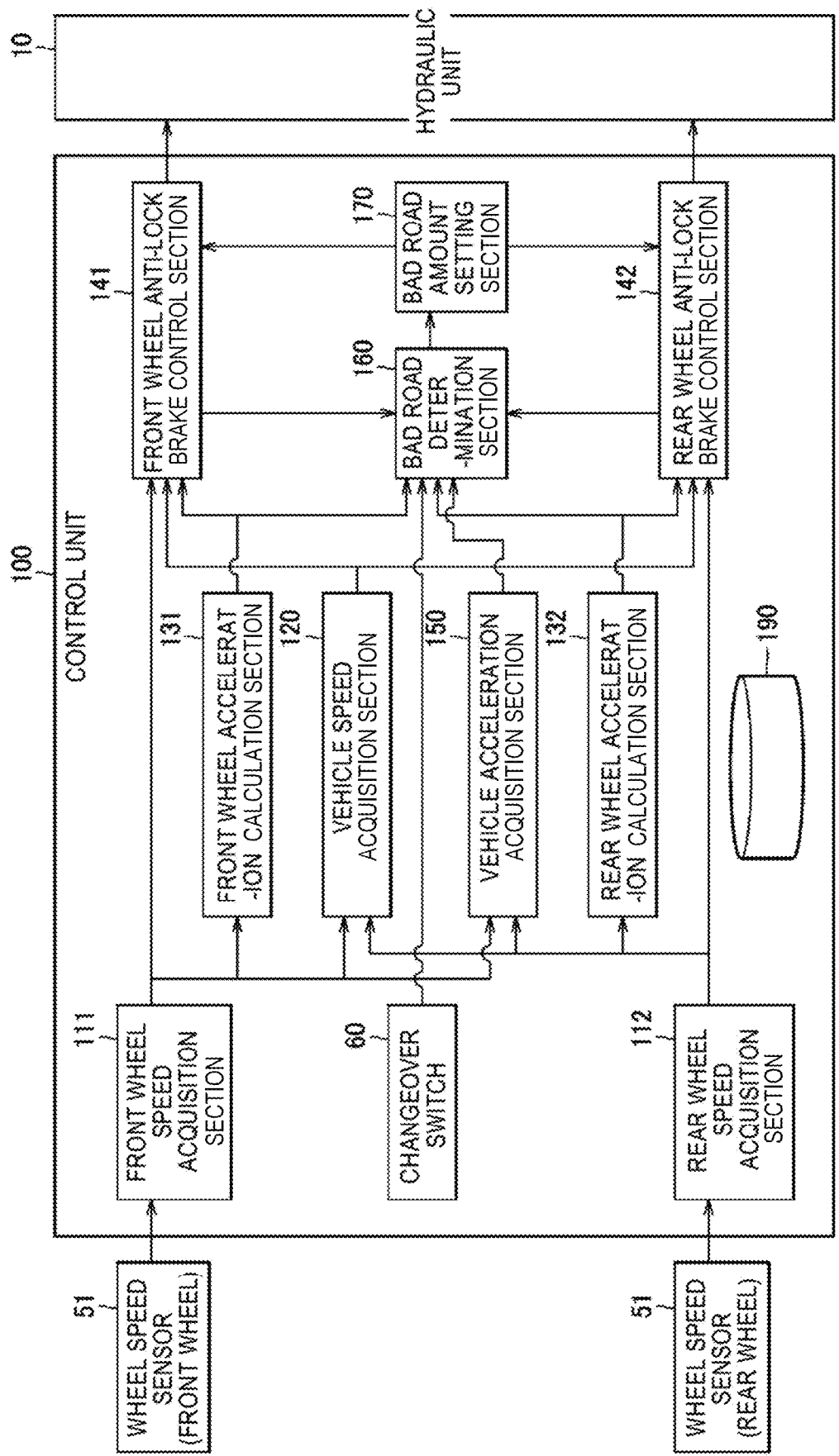
FIG. 2 is a block diagram showing a configuration of a control unit.

As shown in FIG. 2, the control unit 100 includes a changeover switch 60, a front wheel speed acquisition section 111, a rear wheel speed acquisition section 112, a vehicle speed acquisition section 120, a front wheel acceleration calculation section 131, a rear wheel acceleration calculation section 132, a front wheel anti-lock brake control section 141, a rear wheel anti-lock brake control section 142, a vehicle acceleration acquisition section 150, a bad road determination section 160, a bad road amount setting section 170, and a storage section 190.

The front wheel speed acquisition section 111 has a function of acquiring a front wheel speed Vwf via the wheel speed sensor 51. The front wheel speed acquisition section 111 outputs the front wheel speed Vwf to the vehicle speed acquisition section 120, the front wheel acceleration calculation section 131, the front wheel anti-lock brake control section 141 and the vehicle acceleration acquisition section 150.

The rear wheel speed acquisition section 112 has a function of acquiring a rear wheel speed Vwr via the wheel speed sensor 51. The rear wheel speed acquisition section 112 outputs the rear wheel speed Vwr to the vehicle speed acquisition section 120, the rear wheel acceleration calculation section 132, the rear wheel anti-lock brake control section 142 and the vehicle acceleration acquisition section 150.

The vehicle speed acquisition section 120 has a function of acquiring a vehicle speed Vc. Specifically, the vehicle speed acquisition section 120 calculates and acquires the vehicle speed Vc based on the front wheel speed Vwf and the rear wheel speed Vwr by a known method. The vehicle speed acquisition section 120 outputs the vehicle speed Vc to the front wheel anti-lock brake control section 141 and the rear wheel anti-lock brake control section 142.

The front wheel acceleration calculation section 131 has a function of calculating a front wheel acceleration Awf based on the front wheel speed Vwf Specifically, the front wheel acceleration calculation section 131 calculates a first wheel acceleration Awf1 and a second wheel acceleration Awf2 as the front wheel acceleration Awf.

As an example, the front wheel acceleration calculation section 131 calculates the first wheel acceleration Awf1 by differentiating the front wheel speed Vwf and calculates the second wheel acceleration Awf2 by differentiating a value obtained by filtering the front wheel speed Vwf by a low-pass filter. Therefore, the second wheel acceleration Awf2 has a value in which a high-frequency component is attenuated more than the first wheel acceleration Awf1.

The front wheel acceleration calculation section 131 outputs the front wheel acceleration Awf to the front wheel anti-lock brake control section 141 and the bad road determination section 160.

The rear wheel acceleration calculation section 132 has a function of calculating a rear wheel acceleration Awr based on the rear wheel speed Vwr. Specifically, the rear wheel acceleration calculation section 132 calculates a third wheel acceleration Awr1 and a fourth wheel acceleration Awr2 as the rear wheel acceleration Awr.

As an example, the rear wheel acceleration calculation section 132 calculates the third wheel acceleration Awr1 by differentiating the rear wheel speed Vwr and calculates the fourth wheel acceleration Awr2 by differentiating a value obtained by filtering the rear wheel speed Vwr by a low-pass filter. Therefore, the fourth wheel acceleration Awr2 has a value in which a high-frequency component is attenuated more than the third wheel acceleration Awr1.

The rear wheel acceleration calculation section 132 outputs the rear wheel acceleration Awr to the rear wheel anti-lock brake control section 142 and the bad road determination section 160.

The front wheel anti-lock brake control section 141 has a function capable of executing an anti-lock brake control for the front wheel.

The rear wheel anti-lock brake control section 142 has a function capable of executing an anti-lock brake control for the rear wheel.

Specifically, the anti-lock brake control section 141, 142 execute an anti-lock brake control for the front wheel or the rear wheel based on slip amounts SAf, SAr based on the wheel speeds Vwf, Vwr and the vehicle speed Vc.

Specifically, when the wheel accelerations Awf, Awr (Awf1, Awr1) become 0 or less and the slip amounts SAf, SAr become larger than a control intervention threshold, the anti-lock brake control section 141, 142 output an instruction for reducing the braking force (for reducing pressure) to the hydraulic unit 10 to close the inlet valve 1 and open the outlet valve 2.

Further, when the wheel accelerations Awf, Awr (Awf1, Awr1) become larger than 0 after the pressure is reduced, the anti-lock brake control section 141, 142 output an instruction for maintaining the braking force to the hydraulic unit 10 to close both the inlet valve 1 and the outlet valve 2. Furthermore, when the wheel accelerations Awf, Awr (Awf1, Awr1) become 0 or less and the slip amounts SAf, SAr become a control intervention threshold or less after the braking force is maintained, the anti-lock brake control section 141, 142 output an instruction for increasing the braking force (for increasing pressure) to the hydraulic unit 10 to open the inlet valve 1 and close the outlet valve 2.

In the present embodiment, the front wheel anti-lock brake control section 141 calculates the front wheel slip amount SAf by the following equation.

$$SAf = Vc - Vwf - BAf \qquad \text{Equation (1)}$$

BAf is a front wheel bad road amount set by the bad road amount setting section 170.

Further, the rear wheel anti-lock brake control section 142 calculates the rear wheel slip amount SAr by the following equation.

$$SAr = Vc - Vwr - BAr \qquad \text{Equation (2)}$$

BAr is a rear wheel bad road amount set by the bad road amount setting section 170.

Meanwhile, in the disclosure, the "slip amount" may be a value (slip ratio) obtained by dividing the above calculated value by the vehicle speed Vc.

The anti-lock brake control section 141, 142 change ABS execution flags Ff, Fr from 0 (non-execution) to 1 (execution) when the anti-lock brake control is started, and reset the ABS execution flags Ff, Fr from 1 to 0 when the anti-lock brake control is ended. The anti-lock brake control section 141, 142 outputs information on the ABS execution flags Ff, Fr to the bad road determination section 160.

The vehicle acceleration acquisition section 150 has a function of acquiring a vehicle acceleration Ac. Specifically, the vehicle acceleration acquisition section 150 calculates and acquires the vehicle acceleration Ac based on the front wheel speed Vwf and the rear wheel speed Vwr by a known method. Acceleration such as the vehicle acceleration Ac and the wheel accelerations Awf, Awr has a positive value during acceleration and has a negative value during deceleration. The vehicle acceleration acquisition section 150 outputs the vehicle acceleration Ac to the bad road determination section 160.

The bad road determination section 160 has a function of determining whether or not a road surface on which the motorcycle MC runs is a bad road based on the front wheel acceleration Awf or the rear wheel acceleration Awr. The bad road determination section 160 can change the conditions for the bad road determination by the changeover switch 60 according to the accuracy required for the bad road determination. Details will be described later.

The bad road determination section 160 executes a bad road determination by selectively using one of the front wheel acceleration Awf and the rear wheel acceleration Awr at least based on information on whether or not the anti-lock brake control for the front wheel is executed and the vehicle acceleration Ac. Specifically, the bad road determination section 160 executes the bad road determination by using the front wheel acceleration Awf when the anti-lock brake control for the front wheel is not executed (when the front wheel ABS execution flag Ff is 0) and the vehicle acceleration Ac is larger than a predetermined value Acth.

When executing the bad road determination by using the front wheel acceleration Awf, the bad road determination section 160 determines that the running road surface is a bad road when the anti-lock brake control for the rear wheel is executed (when the rear wheel ABS execution flag Fr is 1), the first wheel acceleration Awf1 is larger than a first threshold value Ath1, and the second wheel acceleration Awf2 is smaller than a second threshold value Ath2.

Further, when executing the bad road determination by using the front wheel acceleration Awf, the bad road determination section 160 determines that the running road surface is a bad road when the anti-lock brake control for the rear wheel is not executed (when the rear wheel ABS execution flag Fr is 0), the first wheel acceleration Awf1 is smaller than a third threshold value Ath3, and the second wheel acceleration Awf2 is larger than a fourth threshold value Ath4.

The third threshold value Ath3 is a value smaller than the first threshold value Ath1, and the fourth threshold value Ath4 is a value smaller than the second threshold value Ath2. The first threshold value Ath1 and the third threshold value Ath3 of the first wheel acceleration Awf1, and the second threshold value Ath2 and the fourth threshold value Ath4 of the second wheel acceleration Awf2 are set in advance based on experiments, simulations, and the like. On an ideal good road, the first wheel acceleration Awf1 is equal to the second wheel acceleration Awf2.

Figure 3A:
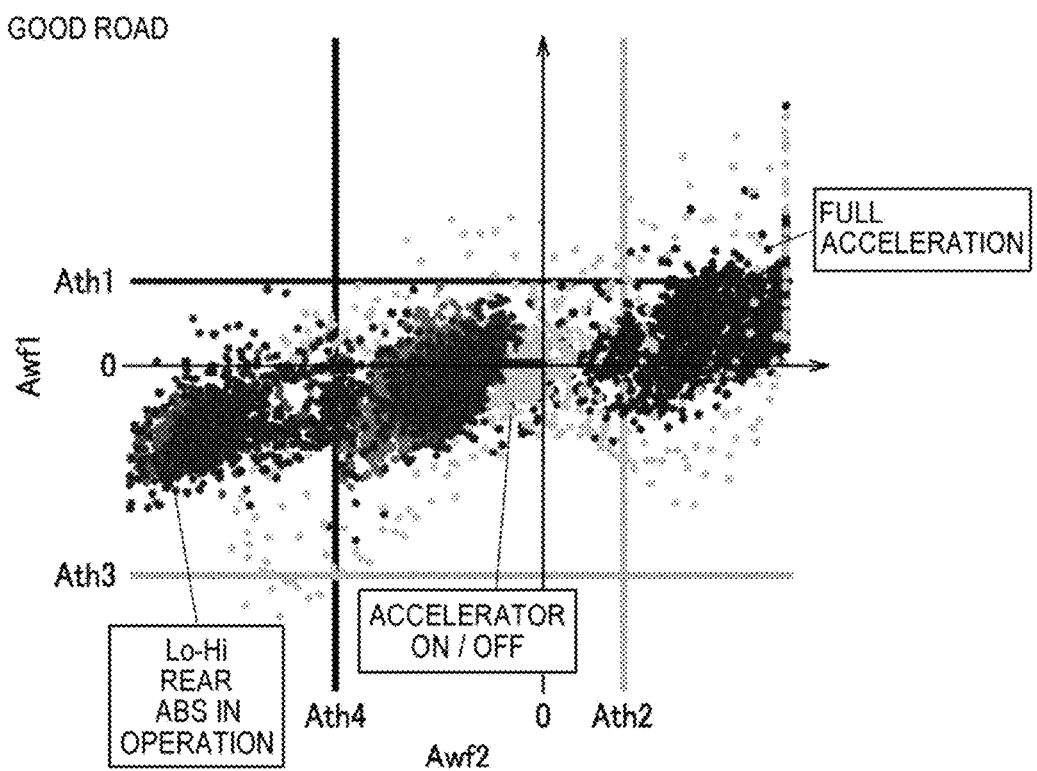
FIGS. 3A and 3B are diagrams plotting a first wheel acceleration and a second wheel acceleration of a front wheel.
Figure 3B:
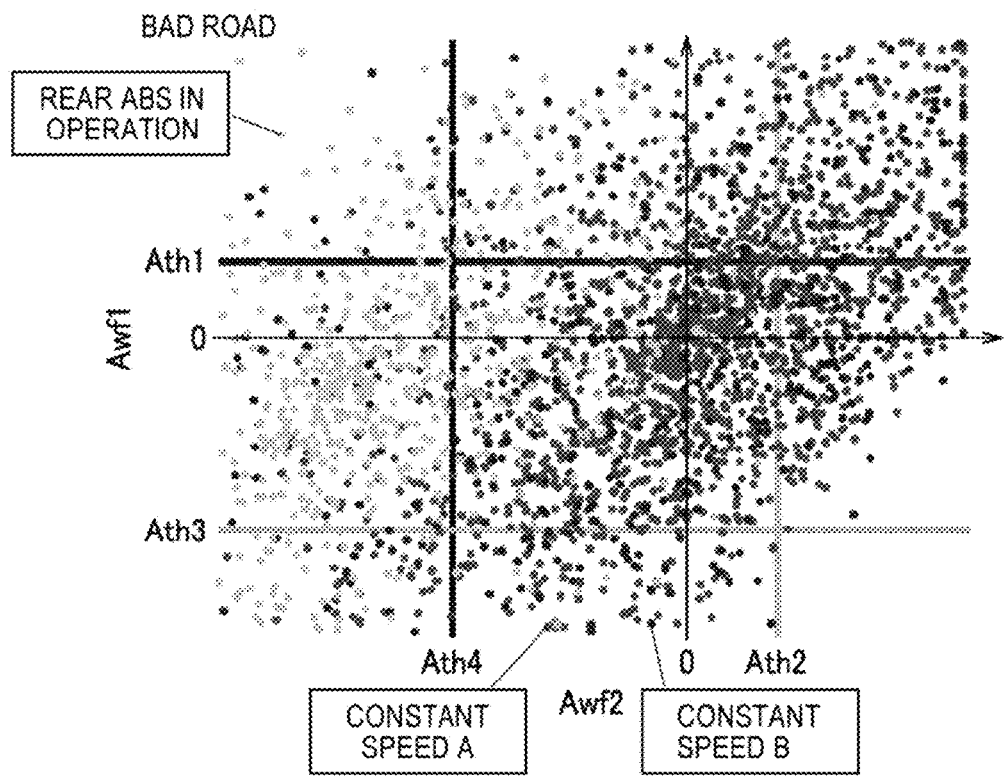

For example, the threshold values Ath1 to Ath4 can be set based on FIG. 3A in which the motorcycle MC is run on a good road (a road surface that is not a bad road) under different running conditions, and the first wheel acceleration Awf1 and the second wheel acceleration Awf2 are calculated and plotted for each running condition, and FIG. 3B in which the motorcycle MC is run on a bad road such as a cobblestone road, and the first wheel acceleration Awf1 and the second wheel acceleration Awf2 are calculated and plotted. Meanwhile, in FIGS. 3A and 3B, the scale of the second wheel acceleration Awf2 (horizontal axis) is larger than the scale of the first wheel acceleration Awf1 (vertical axis).

As shown in FIG. 3B, when the running road surface is a bad road, the plotted points are distributed over substantially the entire area. In particular, the plotted points are plotted up to an area where the first wheel acceleration Awf1 is larger than the first threshold value Ath1 and the second wheel acceleration Awf2 is smaller than the second threshold value Ath2 when the anti-lock brake control for the rear wheel is executed ("REAR ABS IN OPERATION"). Further, the plotted points are plotted up to an area where the first wheel acceleration Awf1 is smaller than the third threshold value Ath3 and the second wheel acceleration Awf2 is larger than the fourth threshold value Ath4 when the motorcycle MC is run on a bad road at constant speeds A, B ("CONSTANT SPEED A" and "CONSTANT SPEED B").

On the other hand, as shown in FIG. 3A, when the running road surface is a good road, the plotted points are concentrated in an area where the first wheel acceleration Awf1 is equal to or less than the first threshold value Ath1 and equal to or larger than the third threshold value Ath3, even in any case of when full acceleration is performed ("FULL ACCELERATION"), when ON/Off of an accelerator is repeated ("ACCELERATOR ON/OFF"), and when the road surface is switched from a low friction coefficient road surface to a high friction coefficient road surface and the anti-lock brake control for the rear wheel is executed ("Lo-Hi REAR ABS IN OPERATION").

Further, when the running road surface is a good road, there is a low probability that the plotted points are located in an area where the first wheel acceleration Awf1 is larger than the first threshold value Ath1 and the second wheel acceleration Awf2 is smaller than the second threshold value Ath2. Further, when the running road surface is a good road, there is a low probability that the plotted points are located in an area where the first wheel acceleration Awf1 is smaller than the third threshold value Ath3 and the second wheel acceleration Awf2 is larger than the fourth threshold value Ath4.

Therefore, the bad road determination section 160 determines that the running road surface is a bad road when the first wheel acceleration Awf1 is larger than the first threshold value Ath1 and the second wheel acceleration Awf2 is smaller than the second threshold value Ath2, or when the first wheel acceleration Awf1 is smaller than the third threshold value Ath3 and the second wheel acceleration Awf2 is larger than the fourth threshold value Ath4.

Further, the bad road determination section 160 executes the bad road determination by using the rear wheel acceleration Awr when the front wheel ABS execution flag Ff is 0 and the vehicle acceleration Ac is equal to or less than the predetermined value Acth, and the rear wheel ABS execution flag Fr is zero. Further, the bad road determination section 160 executes the bad road determination by using the rear wheel acceleration Awr also when the anti-lock brake control for the front wheel is executed (when the front wheel ABS execution flag Ff is 1), and the rear wheel ABS execution flag Fr is 0.

When executing the bad road determination by using the rear wheel acceleration Awr, the bad road determination section 160 determines that the running road surface is a bad road when the third wheel acceleration Awr1 is larger than a fifth threshold value Ath5 and the fourth wheel acceleration Awr2 is smaller than a sixth threshold value Ath6.

The fifth threshold value Ath5 of the third wheel acceleration Awr1 and the sixth threshold value Ath6 of the fourth wheel acceleration Awr2 are set in advance based on experiments, simulations, and the like.

Figure 4A:
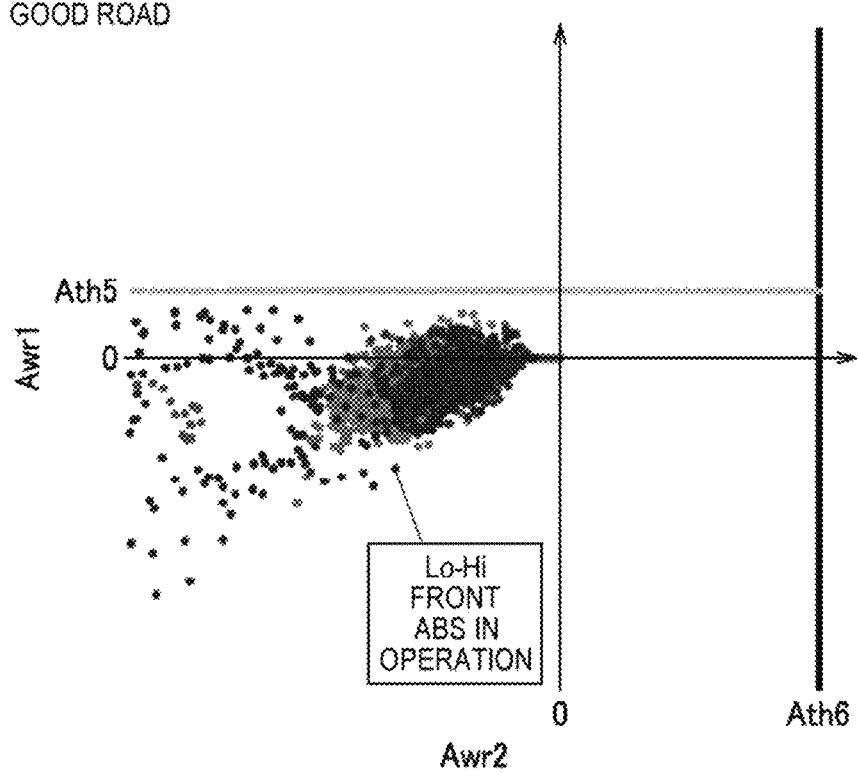
FIGS. 4A and 4B are diagrams plotting a third wheel acceleration and a fourth wheel acceleration of a rear wheel.
Figure 4B:
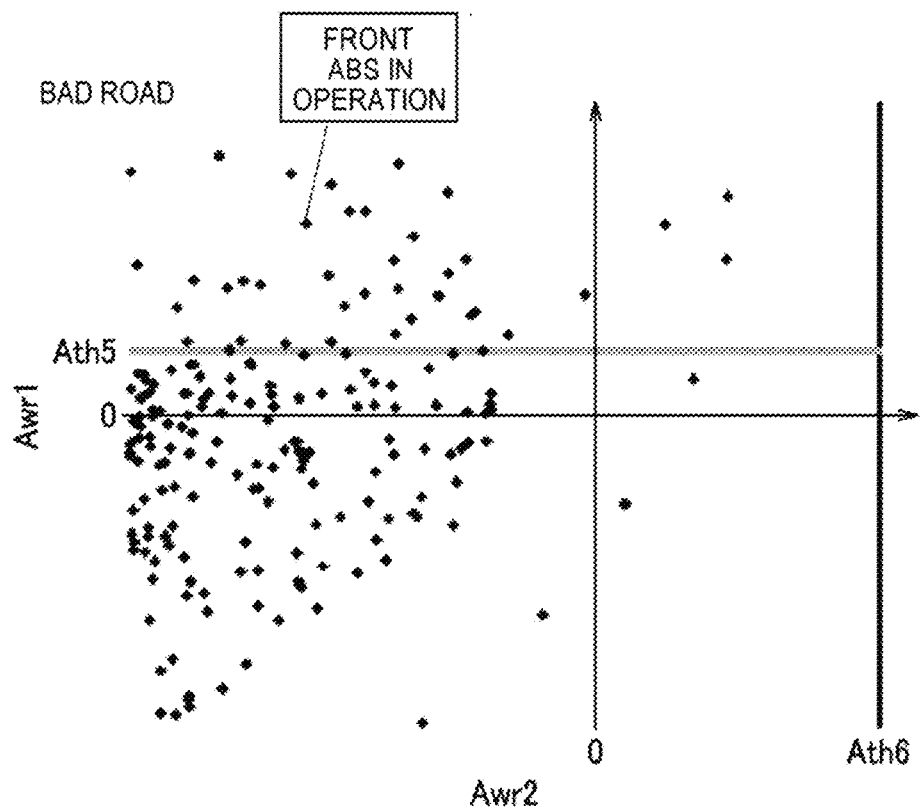

For example, the threshold values Ath5, Ath6 can be set based on FIG. 4A in which the motorcycle MC is run on a good road, and the third wheel acceleration Awr1 and the fourth wheel acceleration Awr2 are calculated and plotted, and FIG. 4B in which the motorcycle MC is run on a bad road, and the third wheel acceleration Awr1 and the fourth wheel acceleration Awr2 are calculated and plotted. Meanwhile, in FIGS. 4A and 4B, the scale of the fourth wheel acceleration Awr2 (horizontal axis) is larger than the scale of the third wheel acceleration Awr1 (vertical axis). On an ideal good road, the third wheel acceleration Awr1 is equal to the fourth wheel acceleration Awr2.

As shown in FIG. 4B, when the running road surface is a bad road, all the plotted points are distributed in an area where the fourth wheel acceleration Awr2 is smaller than the sixth threshold value Ath6. Specifically, when the anti-lock brake control for the front wheel is executed ("FRONT ABS IN OPERATION"), the plotted points are plotted up to an area in which the third wheel acceleration Awr1 is larger than the fifth threshold value Ath5 and the fourth wheel acceleration Awr2 is smaller than the sixth threshold value Ath6.

On the other hand, as shown in FIG. 4A, when the running road surface is a good road, all the plotted points are located in an area where the third wheel acceleration Awr1 is equal to or less than the fifth threshold value Ath5 even when the road surface is switched from a low friction coefficient road surface to a high friction coefficient road surface and the anti-lock brake control for the front wheel is executed ("Lo-Hi FRONT ABS IN OPERATION").

In this way, the bad road determination section 160 determines that the running road surface is a bad road when the third wheel acceleration Awr1 is larger than the fifth threshold value Ath5 and the fourth wheel acceleration Awr2 is smaller than the sixth threshold value Ath6.

In the present embodiment, the bad road determination section 160 executes the bad road determination by selectively using one of the front wheel acceleration Awf and the rear wheel acceleration Awr when the changeover switch 60 provided in the control unit 100 is turned on. On the other hand, when the changeover switch 60 is turned off, the bad road determination section 160 does not execute the bad road determination using the front wheel acceleration Awf, but executes only the bad road determination using the rear wheel acceleration Awr. The bad road determination section 160 outputs the information on the determination result to the bad road amount setting section 170.

The bad road amount setting section 170 has a function of setting the bad road amounts BAf, BAr for correcting the slip amounts SAf, SAr based on the determination result of the bad road determination section 160.

Specifically, when the running road surface is a bad road, the bad road amount setting section 170 increases the front wheel bad road amount BAf by an additional amount OAf and increases the rear wheel bad road amount BAr by an additional amount OAr. Thereafter, the bad road amount setting section 170 reduces the front wheel bad road amount BAf by a subtraction amount RAf and reduces the rear wheel bad road amount BAr by a subtraction amount RAr.

The additional amounts OAf, OAr and the subtraction amounts RAf, RAr are positive values set in advance based on experiments, simulations, and the like. The additional amount OAf is a value larger than the subtraction amount RAf, and the additional amount OAr is a value larger than the subtraction amount RAr. Meanwhile, the additional amount OAf of the front wheel and the additional amount OAr of the rear wheel may be the same value or different values. Similarly, the subtraction amount RAf of the front wheel and the subtraction amount RAr of the rear wheel may be the same value or different values. Predetermined upper and lower limits are set for the bad road amount BAf, BAr. As an example, the lower limit of the bad road amounts BAf, BAr is 0.

Since the bad road amounts BAf, BAr are larger when the running road surface is a bad road, the slip amounts SAf, SAr calculated by the anti-lock brake control section 141, 142 from the equations (1) and (2) become small, and the slip amounts SAf, SAr are unlikely to exceed to the control intervention threshold. As a result, it is difficult to execute the anti-lock brake control when the running road surface is a bad road.

Further, when the running road surface is not a bad road, the bad road amount setting section 170 reduces the front wheel bad road amount BAf by the subtraction amount RAf and reduces the rear wheel bad road amount BAr by the subtraction amount RAr.

Since the bad road amounts BAf, BAr gradually decrease (approach 0) when the running road surface is not a bad road, the slip amounts SAf, SAr calculated by the anti-lock brake control section 141, 142 increase while approaching a value obtained by subtracting the wheel speeds Vwf, Vwr from the vehicle speed Vc. Thereby, the slip amounts SAf, SAr are likely to exceed the control intervention threshold. As a result, the anti-lock brake control when the running road surface is not a bad road is more easily executed than when the running road surface is a bad road.

The bad road amount setting section 170 outputs the front wheel bad road amount BAf to the front wheel anti-lock brake control section 141 and outputs the rear wheel bad road amount BAr to the rear wheel anti-lock brake control section 142.

The storage section 190 stores a program for causing the control unit 100 to function as each section described above, the predetermined value Acth, the threshold values Ath1 to Ath6, the additional amounts OAf, OAr, and the subtraction amounts RAf, RAr, and the like.

Figure 5:
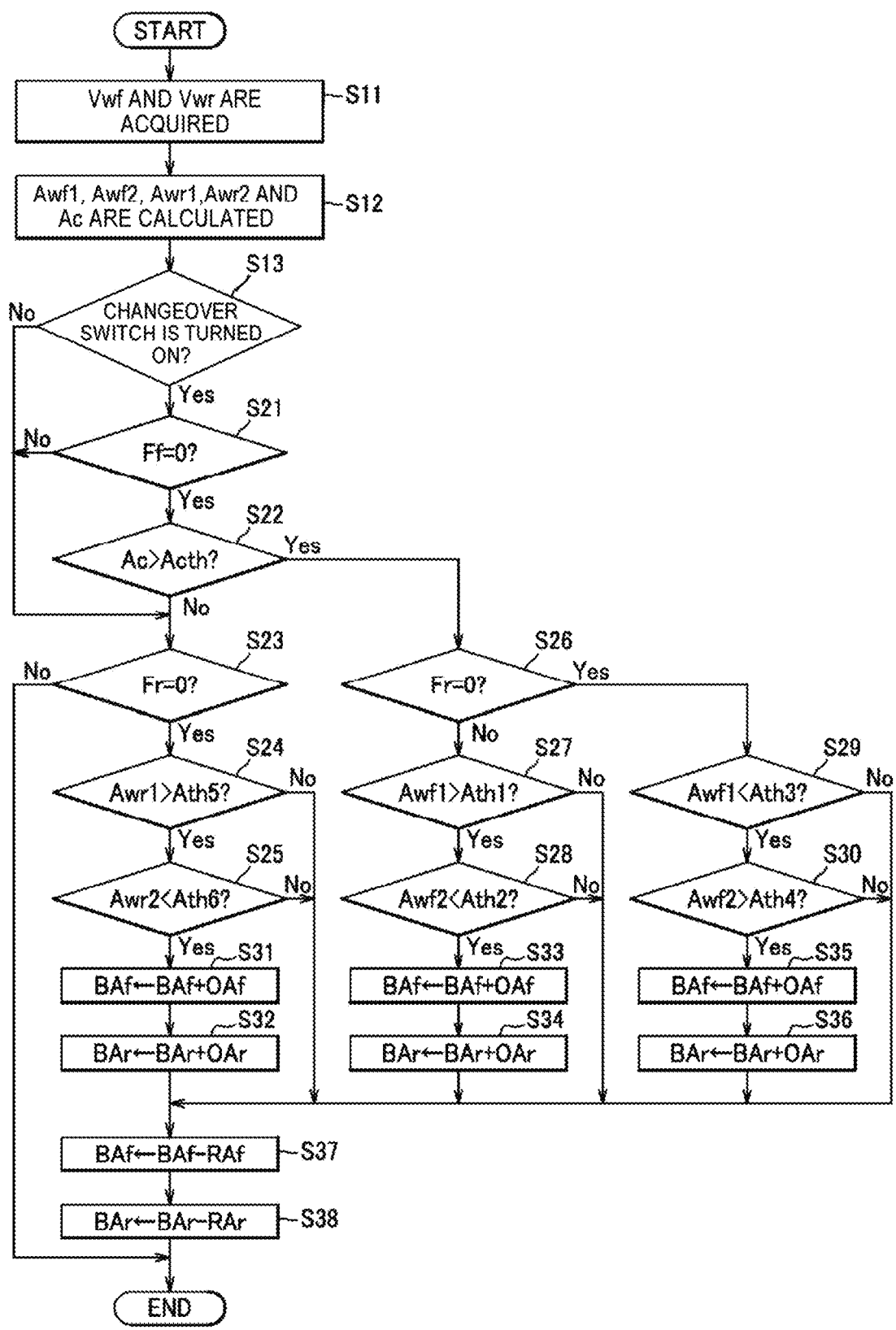
FIG. 5 is a flowchart showing a process performed by the control unit.

Subsequently, the process by the control unit 100, mainly, the process for determining a bad road and the process for setting a bad road amount will be described in detail with reference to FIG. 5. The control unit 100 repeatedly executes the process shown in FIG. 5 for each predetermined control cycle. As shown in FIG. 5, the control unit 100 first acquires the front wheel speed Vwf and the rear wheel speed Vwr from the wheel speed sensor 51 (S11).

Thereafter, the control unit 100 calculates the front wheel acceleration Awf (the first wheel acceleration Awf1 and the second wheel acceleration Awf2), the rear wheel acceleration Awr (the third wheel acceleration Awr1 and the fourth wheel acceleration Awr2), and the vehicle acceleration Ac based on the wheel speeds Vwf, Vwr (S12).

Then, the control unit 100 determines whether or not the changeover switch 60 is turned on (S13). When it is determined that the changeover switch 60 is turned on (S13, Yes), the control unit 100 determines whether or not the front wheel ABS execution flag Ff is 0 (S21).

When it is determined that the front wheel ABS execution flag Ff is 0 (S21, Yes), the control unit 100 determines whether or not the vehicle acceleration Ac is larger than the predetermined value Acth (S22). When it is determined that the vehicle acceleration Ac is larger than the predetermined value Acth (S22, Yes), the control unit 100 determines whether or not the rear wheel ABS execution flag Fr is 0 (S26).

When it is determined that the rear wheel ABS execution flag Fr is 1 (S26, No), the control unit 100 determines whether or not the first wheel acceleration Awf1 is larger than the first threshold value Ath1 (S27). When it is determined that the first wheel acceleration Awf1 is larger than the first threshold value Ath1 (S27, Yes), the control unit 100 determines whether or not the second wheel acceleration Awf2 is smaller than the second threshold value Ath2 (S28). Further, when it is determined that the second wheel acceleration Awf2 is smaller than the second threshold value Ath2 (S28, Yes), the running road surface is a bad road.

On the other hand, when it is determined in Step S26 that the rear wheel ABS execution flag Fr is 0 (Yes), the control unit 100 determines whether or not the first wheel acceleration Awf1 is smaller than the third threshold value Ath3 (S29). When it is determined that the first wheel acceleration Awf1 is smaller than the third threshold value Ath3 (S29, Yes), the control unit 100 determines whether or not the second wheel acceleration Awf2 is larger than the fourth threshold value Ath4 (S30). Further, when it is determined that the second wheel acceleration Awf2 is larger than the fourth threshold value Ath4 (S30, Yes), the running road surface is a bad road.

Further, when it is determined in Step S13 that the changeover switch 60 is turned off (No), when it is determined in Step S21 that the front wheel ABS execution flag Ff is 1 (No), or when it is determined in Step S22 that the vehicle acceleration Ac is equal to or less than the predetermined value Acth (No), the control unit 100 determines whether or not the rear wheel ABS execution flag Fr is 0 (S23).

When it is determined that the rear wheel ABS execution flag Fr is 0 (S23, Yes), the control unit 100 determines whether or not the third wheel acceleration Awr1 is larger than the fifth threshold value Ath5 (S24). When it is determined that the third wheel acceleration Awr1 is larger than the fifth threshold value Ath5 (S24, Yes), the control unit 100 determines whether or not the fourth wheel acceleration Awr2 is smaller than the sixth threshold value Ath6 (S25). Further, when it is determined that the fourth wheel acceleration Awr2 is smaller than the sixth threshold value Ath6 (S25, Yes), the running road surface is a bad road.

When the road surface is a bad road, the control unit 100 first adds the additional amount OAf to the front wheel bad road amount (previous value) BAf (S31, S33 or S35), and adds the additional amount OAr to the rear wheel bad road amount (previous value) BAr (S32, S34 or S36). Thereafter, the control unit 100 calculates the bad road amount (present value) BAf by subtracting the subtraction amount RAf from the front wheel bad road amount BAf to which the additional amount OAf is added (S37), and calculates the bad road amount (present value) BAr by subtracting the subtraction amount RAr from the rear wheel bad road amount BAr to which the additional amount OAr is added (S38). In this way, the control unit 100 ends its process.

When it is determined in Step S27 that the first wheel acceleration Awf1 is equal to or less than the first threshold value Ath1 (No), when it is determined in Step S28 that the second wheel acceleration Awf2 is equal to or larger than the second threshold value Ath2 (No), when it is determined in Step S29 that the first wheel acceleration Awf1 is equal to or larger than the third threshold value Ath3 (No), when it is determined in Step S30 that the second wheel acceleration Awf2 is equal to or less than the fourth threshold value Ath4 (No), when it is determined in Step S24 that the third wheel acceleration Awr1 is equal to or less than the fifth threshold value Ath5 (No), or when it is determined in Step S25 that the fourth wheel acceleration Awr2 is equal to or larger than the sixth threshold value Ath6 (No), the running road surface is not a bad road.

When the running road surface is not a bad road, the control unit 100 calculates the front wheel bad road amount (present value) BAf by subtracting the subtraction amount RAf from the front wheel bad road amount (previous value) BAf (S37), and calculates the rear wheel bad road amount (present value) BAr by subtracting the subtraction amount RAr from the rear wheel bad road amount (previous value) BAr (S38). In this way, the control unit 100 ends its process.

Meanwhile, when it is determined in Step S23 that the rear wheel ABS execution flag Fr is 1 (No), the control unit 100 ends its process without performing the bad road determination and the setting (changing) on the bad road amounts BAf, BAr.

According to the present embodiment described above, since the bad road determination is executed by selectively using one of the front wheel acceleration Awf and the rear wheel acceleration Awr, the bad road determination can be executed by properly using the front wheel acceleration Awf and the rear wheel acceleration Awr according to the state of the motorcycle MC. In this way, the accuracy of the bad road determination can be improved.

For example, when the vehicle acceleration Ac is larger than the predetermined value Acth, such as during acceleration in which an acceleration operation is performed, it may be difficult, from the rear wheel acceleration Awr, to distinguish whether an acceleration operation is performed or whether the motorcycle is run on a bad road. Therefore, in this case, the bad road determination is executed using the front wheel acceleration Awf that is stable because the anti-lock brake control is not executed. In this way, the accuracy of the bad road determination can be improved.

Further, when executing the bad road determination by using the front wheel acceleration Awf, the bad road determination is executed in a state where the threshold values Ath1 to Ath4 are set for two types of wheel accelerations Awf with different responsiveness, specifically, the first wheel acceleration Awf1 and the second wheel acceleration Awf2, respectively. Therefore, the accuracy of the bad road determination can be further improved.

Further, the front wheel acceleration Awf may not be stable during a high deceleration at which the vehicle acceleration Ac is equal to or less than the predetermined value Acth. Therefore, in this case, the anti-lock brake control is not executed, and the bad road determination is executed by using the rear wheel acceleration Awr that is more stable than the front wheel acceleration Awf. In this way, the accuracy of the bad road determination can be improved.

Further, the front wheel acceleration Awf is not stable while the anti-lock brake control is executed. Therefore, in this case, the anti-lock brake control is not executed, and the bad road determination is executed by using the rear wheel acceleration Awr that is more stable than the front wheel acceleration Awf. In this way, the accuracy of the bad road determination can be improved.

Further, when executing the bad road determination by using the rear wheel acceleration Awr, the bad road determination is executed in a state where the threshold values Ath5, Ath6 are set for two types of wheel accelerations Awr with different responsiveness, specifically, the third wheel acceleration Awr1 and the fourth wheel acceleration Awr2, respectively. Therefore, the accuracy of the bad road determination can be further improved.

Although one embodiment of the disclosure has been described above, the disclosure is not limited to the above embodiment, and can be implemented with appropriate modifications. For example, although, in the above embodiment, the motorcycle MC includes the changeover switch 60 for switching the specification of the bad road determination, a configuration without such a changeover switch may be adopted.

Further, although, in the above embodiment, the fourth threshold value Ath4 is a value smaller than the second threshold value Ath2, the second threshold value and the fourth threshold value may be the same value.

Further, although, in the above embodiment, a hydraulic brake device using a brake fluid is exemplified as the brake device controlled by the control unit 100 (vehicle brake control device), a brake device may be, for example, an electric brake device that generates a braking force by an electric motor without using a brake fluid.

Further, although, in the above embodiment, the motorcycle MC has a configuration in which the rear wheel brake system BR is operated by the brake pedal LR, the motorcycle MC may have a configuration in which the rear wheel brake system is operated by a manually-operated brake lever, for example.

Further, although, in the above embodiment, the motorcycle MC is exemplified as a vehicle to which the present disclosure is applied, the vehicle may be, for example, a bar-handle vehicle other than a motorcycle, such as an auto-tricycle and a buggy car, or may be an automobile or the like.

Further, the components described in the embodiments and modifications described above can be implemented in appropriate combinations.

What is claimed is:

1. A vehicle brake control device comprising:
   a front wheel speed acquisition section configured to acquire a wheel speed of a front wheel that is a driven wheel;
   a rear wheel speed acquisition section configured to acquire a wheel speed of a rear wheel that is a drive wheel;
   a front wheel acceleration calculation section configured to calculate a front wheel acceleration based on the front wheel speed;
   a rear wheel acceleration calculation section configured to calculate a rear wheel acceleration based on the rear wheel speed;
   a front wheel anti-lock brake control section capable of executing an anti-lock brake control for the front wheel;
   a vehicle acceleration acquisition section configured to acquire a vehicle acceleration; and
   a bad road determination section configured to determine whether or not a running road surface is a bad road based on the front wheel acceleration or the rear wheel acceleration,
   wherein the bad road determination section executes a bad road determination by selectively using one of the front wheel acceleration and the rear wheel acceleration at least based on information on whether or not the anti-lock brake control for the front wheel is executed and the vehicle acceleration, the bad road determination is executed by selectively using either the front wheel acceleration or the rear wheel acceleration based on information on whether or not the anti-lock brake control for the front wheel is executed,
   wherein the bad road determination section executes the bad road determination by using the front wheel acceleration when the anti-lock brake control for the front wheel is not executed and the vehicle acceleration is larger than a predetermined value,
   further comprising a rear wheel anti-lock brake control section capable of executing an anti-lock brake control for the rear wheel,
   wherein the front wheel acceleration calculation section calculates, as the front wheel acceleration, a first wheel acceleration and a second wheel acceleration in which a high-frequency component is attenuated more than the first wheel acceleration,
   wherein the bad road determination section determines that the running road surface is a bad road when the anti-lock brake control for the rear wheel is executed, and when the first wheel acceleration is larger than a first threshold value and the second wheel acceleration is smaller than a second threshold value, and
   wherein the bad road determination section determines that the running road surface is a bad road when the anti-lock brake control for the rear wheel is not executed, and when the first wheel acceleration is smaller than a third threshold value smaller than the first threshold value and the second wheel acceleration is larger than a fourth threshold value.

2. The vehicle brake control device according to claim 1, wherein the fourth threshold value is smaller than the second threshold value.

3. The vehicle brake control device according to claim 1, comprising a rear wheel anti-lock brake control section capable of executing an anti-lock brake control for the rear wheel,
   wherein the bad road determination section executes the bad road determination by using the rear wheel acceleration when the vehicle acceleration is equal to or less than a predetermined value and the anti-lock brake control for the rear wheel is not executed.

4. The vehicle brake control device according to claim 1, comprising a rear wheel anti-lock brake control section capable of executing an anti-lock brake control for the rear wheel,
   wherein the bad road determination section executes the bad road determination by using the rear wheel acceleration when the anti-lock brake control for the front wheel is executed and the anti-lock brake control for the rear wheel is not executed.

5. The vehicle brake control device according to claim 3, wherein the rear wheel acceleration calculation section calculates, as the rear wheel acceleration, a third wheel acceleration and a fourth wheel acceleration in which a high-frequency component is attenuated more than the third wheel acceleration, and wherein the bad road determination section determines that the running road surface is a bad road when the third wheel acceleration is larger than a fifth threshold value and the fourth wheel acceleration is smaller than a sixth threshold value.

6. The vehicle brake control device according to claim 4, wherein the rear wheel acceleration calculation section calculates, as the rear wheel acceleration, a third wheel acceleration and a fourth wheel acceleration in which a high-frequency component is attenuated more than the third wheel acceleration, and
wherein the bad road determination section determines that the running road surface is a bad road when the third wheel acceleration is larger than a fifth threshold value and the fourth wheel acceleration is smaller than a sixth threshold value.

7. The vehicle brake control device according to claim 1, wherein the bad road determination section executes the bad road determination using the front wheel acceleration when the anti-lock brake control for the front wheel is not executed and the vehicle acceleration is larger than a predetermined value.

8. The vehicle brake control device according to claim 7, wherein when executing the bad road determination by using the front wheel acceleration, the bad road determination section determines that the running road surface is a bad road when the anti-lock brake control for the rear wheel is executed, a first wheel acceleration is larger than a first threshold value, and a second wheel acceleration is smaller than a second threshold value.

9. The vehicle brake control device according to claim 8, wherein when executing the bad road determination by using the front wheel acceleration, the bad road determination section determines that the running road surface is a bad road when the anti-lock brake control for the rear wheel is not executed, the first wheel acceleration is smaller than a third threshold value, and the second wheel acceleration is larger than a fourth threshold value.

10. The vehicle brake control device according to claim 9, wherein the third threshold value is a value smaller than the first threshold value, and the fourth threshold value is a value smaller than the second threshold value.

11. The vehicle brake control device according to claim 1, wherein the bad road determination section executes the bad road determination using the rear wheel acceleration when the anti-lock brake control for the front wheel is executed, and an anti-lock brake control for the rear wheel is not executed.

12. The vehicle brake control device according to claim 11, wherein when executing the bad road determination using the rear wheel acceleration, the bad road determination section determines that the running road surface is a bad road when a third wheel acceleration is larger than a fifth threshold value and a fourth wheel acceleration is smaller than a sixth threshold value.

13. The vehicle brake control device according to claim 1, wherein the bad road determination section executes the bad road determination by using the rear wheel acceleration when the anti-lock brake control for the front wheel is not executed and the vehicle acceleration is equal to or less than a predetermined value, and the anti-lock brake control for the rear wheel is not executed.

14. The vehicle brake control device according to claim 1, wherein when the front wheel acceleration is not stable during a high deceleration at which the vehicle acceleration is equal to or less than a predetermined value, the anti-lock brake control is not executed, and the bad road determination is executed by using the rear wheel acceleration that is more stable than the front wheel acceleration.

15. The vehicle brake control device according to claim 1, wherein when the front wheel acceleration is not stable while the anti-lock brake control is executed, the anti-lock brake control is not executed, and the bad road determination is executed by using the rear wheel acceleration that is more stable than the front wheel acceleration.

16. The vehicle brake control device according to claim 1, wherein when executing the bad road determination by using the rear wheel acceleration, the bad road determination is executed in a state where threshold values are set for two types of wheel accelerations with different responsiveness.

* * * * *